Nov. 11, 1969  T. J. LYTLE  3,477,646
SCARFING UNIT
Filed Jan. 6, 1967  5 Sheets-Sheet 1
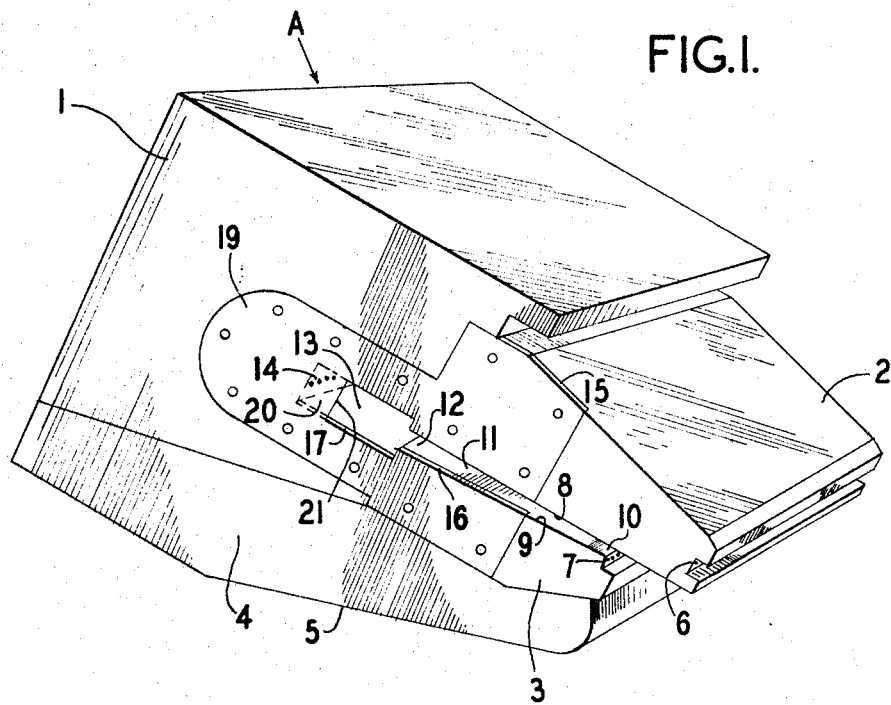
INVENTOR
THOMAS J. LYTLE
BY
Lawrence G. Kastriner
ATTORNEY Nov. 11, 1969    T. J. LYTLE    3,477,646
SCARFING UNIT
Filed Jan. 6, 1967    5 Sheets-Sheet 2

INVENTOR
THOMAS J. LYTLE
BY
ATTORNEY

Nov. 11, 1969 T. J. LYTLE 3,477,646
SCARFING UNIT

Filed Jan. 6, 1967 5 Sheets-Sheet 3

INVENTOR
THOMAS J. LYTLE
BY
Lawrence J. Kastriner
ATTORNEY

United States Patent Office 3,477,646
Patented Nov. 11, 1969

3,477,646
SCARFING UNIT
Thomas J. Lytle, West Orange, N.J., assignor to Union Carbide Corporation, a corporation of New York
Filed Jan. 6, 1967, Ser. No. 607,830
Int. Cl. B05b 1/00; G23f 7/00
U.S. Cl. 239—433                    6 Claims

ABSTRACT OF THE DISCLOSURE

A continuous slot scarfing unit having higher capacity than heretofore obtainable and which at the same time produces scarfed surfaces of very high quality is obtained by having its continuous slot nozzle tapered to converge toward its discharge end and, additionally, by having an expansion chamber in back of the slotted nozzle. These improvements cause the sheet-like stream of scarfing oxygen emitted from the scarfing unit to have a uniform velocity and flow rate across the entire width of the nozzle. These scarfing units when used in a bank of units have no side-walls on the slot and only stub side-walls on the expansion chamber on those sides of each unit which form the inside of the bank.

BACKGROUND

This invention relates to the thermochemical conditioning of ferrous metal bodies, commonly referred to as scarfing; and more particularly to an apparatus capable of producing scarfed surfaces of higher quality and at faster production speeds than heretofore possible.

Over the years, the steel industry has continuously had to improve surface quality of steel in order to meet more rigid customer specifications. To obtain such improved quality, steel mills have turned to scarfing machines, i.e. machines which remove surface defects, such as cracks, seams, and slag inclusions by removing the surface layer from metal bodies such as slabs, blooms, ingots and billets. Such defects, if not removed, would produce flaws in the finished product. It is customary to scarf the surface of steel bodies at an intermediate stage of the rolling operations. Frequently, a scarfing machine is interposed in the mill conveyor line between roll stands, such as after the blooming mill rolls. In this way, the steel may be conditioned while hot and without interruption of the continuous production.

Two basic types of scarfing are generally recognized in the art, "hot" scarfing and "cold" scarfing. As the term is used in the art, "hot" scarfing refers to scarfing carried out in the production line at rolling temperature, normally around 2000° F. Normally, the machines remove from ½₂ to ³⁄₁₆ inch of metal in one pass. Hot scarfing speeds normally vary from approximately 50 to 250 linear feet per minute. At such speeds, the steel can be conditioned without interruption to the production process.

In many instances it is impossible to physically alter the mill in such manner as to locate a hot scarfing machine directly in the production line. "Cold" scarfing then becomes necessary. The term "cold" scarfing is used in the art, generally, with reference to scarfing performed outside the rolling line and at temperatures below normal rolling temperature. Cold scarfing temperatures may range from ambient temperature up to 1500° F. Cold scarfing may be used to augment, and in some places to replace, hot scarfing. Cold scarfing machines like hot scarfing machines may be used to scarf ingots, blooms, billets, rounds and slabs. The depth of the cut is controlled by varying the scarfing speed, as well as the volume of scarfing oxygen put through the scarfing unit. Cold scarfing speed normally ranges from about 30–150 linear feet per minute, depending on steel temperature, steel analysis, oxygen throughput and the depth of the cut desired.

Two types of cold scarfing units are now available. One type is equipped with a "powder" nozzle for injecting iron powder into the oxygen stream. The heat generated by the burning powder permits starts to be made on cold steel in a matter of seconds. When scarfing steel, the powder is shut off after scarfing has started, when scarfing stainless steel, however, it is used continuously. The second type of unit, which is commonly referred to as a "high preheat" unit is capable of making starts on flame cut or sawed ends without the use of powder. Such a unit is described in my copending application Ser. No. 508,908 filed Nov. 22, 1965, the disclosure of which is incorporated herein by reference.

The best type of scarfing unit presently known is believed to be the continuous slot type of scarfing unit. Such units can be adapted for use in hot or cold scarfing, and with or without powder. Such units are described in detail in Allmang et al., U.S. Patent No. 2,838,431; Allmang, U.S. Patent No. 3,231,431; Thompson et al., U.S. Patent No. 2,745,475 and in Miller, U.S. Patent No. 2,897,883. The disclosure of said patents is incorporated herein by reference.

Scarfing units such as described above can be used with a variety of fuel gases, including acetylene, natural gas, methane, propane coke oven gas, as well as propane-air mixtures; natural gas is generally preferred.

Despite the fact that continuous slot scarfing units have met with very considerable commercial success, the quality of the scarfed surface is not as high as desirable, particularly as one attempts to increase scarfing speed which necessitates increasing the volume of scarfing oxygen flow through each scarfing unit.

Conventional scarfing machines are designed to use a bank, i.e. plurality of scarfing units, each of which is butted, side-by-side, with another like unit in order to increase the width of a metal body which may be scarfed by a machine in one pass. More specifically, since each scarfing unit is approximately 10.7 inches in width, and since a scarfing machine is designed to handle slabs up to 96 inches or more wide, it requires a plurality of scarfing units to scarf such a slab across its entire width in one pass. It would be impractical to manufacture one scarfing unit wide enough to handle a 96 inch slab. Furthermore, by having a plurality of scarfing units on a machine, should one of these units become damaged or inoperative, it is only necessary to replace that unit rather than all of the units on the machine. Having a plurality or bank of butted up scarfing units results, however, in another problem, namely the production of ridges or grooves (depending on flow rate) along the surface of the metal body being scarfed. These ridges or grooves are produced along the point where the units butt up against each other.

OBJECTS

It is an object of the present invention to provide a scarfing unit capable of producing a scarfed surface of high quality, i.e. characterized by smoothness across the entire width of the scarfed body. It is another object of this invention to provide a scarfing unit having high scarfing capacity, i.e. one capable of operating at a relatively high rate of oxygen throughput without impairing the quality of the scarfed surface produced thereby. It is yet another object to provide a scarfing unit which when used in combination with other units of the same type in a butted side-by-side relationship is capable of producing a scarfed surface of high quality characterized by smoothness across the entire surface being scarfed and having no ridges corresponding to the point where the individual units butt up against each other.

SUMMARY OF INVENTION

These and other objects, which will become apparent from the detailed disclosure and claims to follow, are achieved by the present invention, one aspect of which comprises: in a scarfing unit provided with flat upper and lower surfaces defining therebetween a wide continuous slot nozzle adapted to discharge a sheet-like stream of oxidizing gas in a zone extending across a metal body to be scarfed, the improvement comprising tapered upper and lower surfaces defining said slotted nozzle uniformly converging towards the discharge end of said nozzle by an included angle of up to about 5°.

A second aspect of the present invention comprises, in addition, providing an expansion chamber communicating with the back end of said slotted nozzle, the side surfaces of said expansion chamber being closed for a distance at least sufficient to substantially prevent air from being drawn by vacuum into said chamber, said vacuum normally being produced by the high velocity jets of oxidizing gas flowing into said chamber through one or more orifices.

The continuous slot nozzle is preferably defined or formed by the lower surface of the upper preheat block and the upper surface of the lower preheat block. The expansion chamber communicating with said slotted nozzle is preferably located in the head.

THE DRAWINGS

In the drawings:

FIGURE 1 is a perspective view of thermochemical apparatus, i.e. a scarfing unit, according to the present invention.

FIGURE 2 shows the stub side-plate which may be used to partially close one or both sides of the expansion chamber of the scarfing unit of FIGURE 1.

FIGURE 3 shows the side-plate which may be used to cover one or both sides of the chamber and slot of the scarfing unit of FIGURE 1 when the scarfing unit is used as an outside or end unit in a bank of such units or when used as a single unit.

PREFERRED EMBODIMENT

Figure 4:
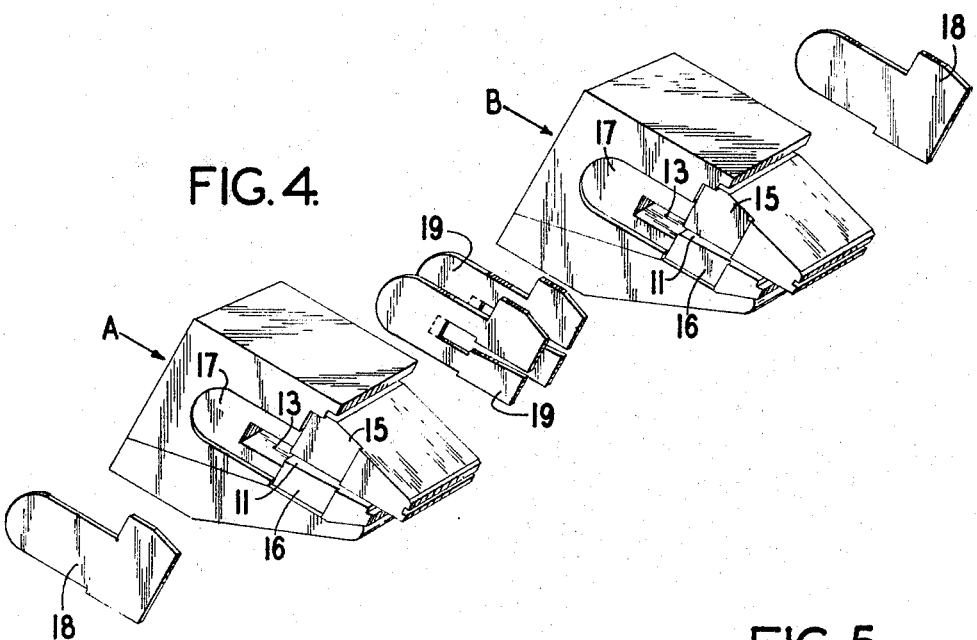
FIGURE 4 is an exploded view of a plurality or bank of scarfing units according to the present invention.

Referring to FIGURE 1 the scarfing unit comprises a head 1, an upper preheat block 2, a lower preheat block 3 and a shoe 4. Each of the above components is provided with water cooling (not shown). According to methods known in the art, the oxygen passages in head 1 and the fuel gas passages in the upper and lower preheat blocks 2 and 3 are divided into separately controllable segments (not shown) so that the scarfing width may be selected to cover sections of metal having varying widths.

Shoe 4 remains in contact at its lower surface 5 with the workpiece being scarfed even if camber is present, thus maintaining a relatively constant relationship between the workpiece and the stream of scarfing oxygen flowing from the continuous slotted nozzle. The upper preheat block 2 is provided with appropriate passages (not shown) for fuel gas and/or premixed oxygen; such preheat gases being discharged through a plurality of orifices 6 located widthwise across the front face of upper preheat block 2. Lower preheat block 3 is also provided with a plurality of appropriate preheat fuel gas passages (not shown) communicating with preheat orifices 7 located widthwise across the front face of lower preheat block 3.

Figure 9:
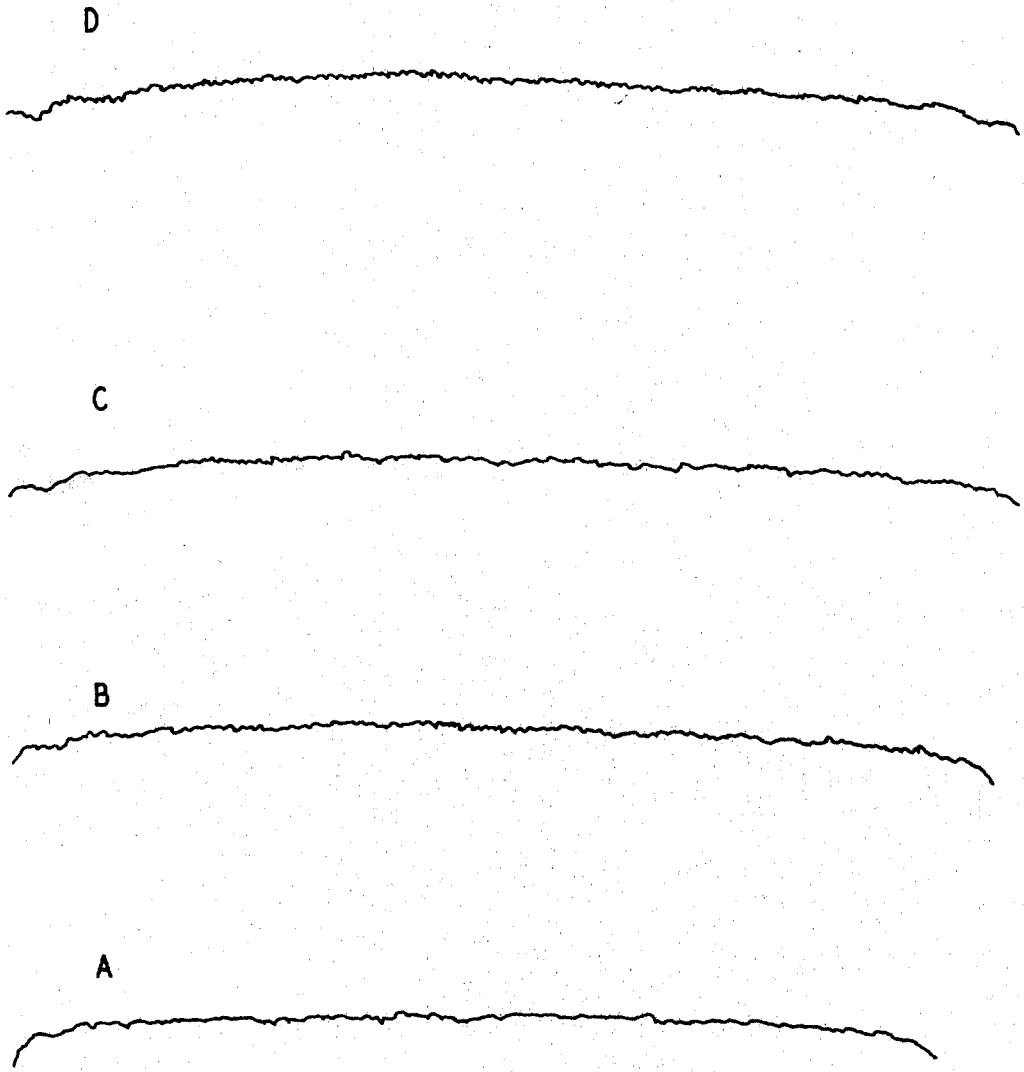
FIGURE 9 is a graph or flow profile of the impact pressure, at various flow rates, of the oxygen flowing from, and taken across the width of a continuous slot nozzle scarfing unit according to the present invention having a tapered slot converging toward the discharge end thereof by about 0.5° and having an expansion chamber communicating with the back end of said slot.

The flat lower surface 8 of upper preheat block 2 and the flat upper surface 9 of lower preheat block 3 is tapered in such manner that the continuous slot nozzle formed by the planar surfaces 8 and 9 converges uniformly toward the discharge end 10 of the wide slotted nozzle passage 11. In other words, the cross section of slot 11 at the discharge end 10 is smaller than its cross section at its back end 12. The convergence of the slotted nozzle 11 should be no greater than about 5°; preferably the convergence is between 0.5 and 1.0°. The angle of convergence is the included angle formed between flat surfaces 8 and 9. The back end 12 of slotted nozzle 11 communicates with expansion chamber 13 located in head 1. Chamber 13 has a thickness of greater than the thickness of the back end 12 of slot 11 and is of the same width as slot 11, i.e., the cross sectional area of chamber 13 is greater than the cross sectional area of the back end 12 of slot 11. During operation, scarfing oxygen flows into expansion chamber 13 at high velocity through one or more orifices 14 located widthwise across the back wall of chamber 13. The expansion chamber 13 permits the high velocity streams or jets of oxygen flowing from orifices 14 to co-mingle or blend together so that they lose their individual stream characteristics. The scarfing oxygen then flows from chamber 13, compressed into slot 11, as an integral mass of gas uniformly distributed across the width of the continuous slot 11, emerging therefrom at its discharge end 10 as a sheet-like stream of oxidizing gas having a substantially uniform velocity and flow rate across the entire width of the scarfing unit. FIGURE 9 shows its flow profile.

The two side surfaces of chamber 13 must be closed for a distance at least sufficient to prevent air from being drawn by vacuum into said chamber. A vacuum is caused by the fact that the oxygen flows into chamber 13 through one or more orifices 14 at high velocity. In the area surrounding these oxygen jets a condition of negative pressure or vacuum exits. Consequently, it has been found necessary to have at least a stub side-wall 20 covering both sides of chamber 13.

In order to make the scarfing unit suitable for use in a bank of like units, the side surfaces of the scarfing unit shown in FIGURE 1 are made flat so that they can be butted side-by-side against each other. To make the same unit suitable as an individual unit, as well as for both an "outside" unit or "inside" unit in a bank of units, a groove 15 about 1/16 of an inch deep is machined into both side surfaces of upper preheat block 2. A groove 16 is machined into both side surfaces of lower preheat block 3, and a groove 17 is machined into both side surfaces of head 1. The contour of grooves 15, 16 and 17 together is the same as plates 18 and 19 shown in FIGURES 2 and 3 respectively. Plates 18 and 19 are of the same thickness as the depth of groove 15, 16 and 17. If the scarfing unit is to be used as an "outside" unit then an end plate 18, such as shown in FIGURE 3, is placed into grooves 15, 16 and 17 on the side of the scarfing unit to form the end of the bank. Side-plate 18 is attached by flat headed screws 22 or any other appropriate means, for securely mounting side-plate 18 flush with the side surface of the scarfing unit. When side-plate 18 is in place, the side of chamber 13 is entirely closed and about 60% of the length of the side of slot 11 is also closed so that the oxidizing gas does not escape out the side of the unit.

If the scarfing unit is to be used as an "inside" unit, in a bank of such scarfing units, then the slotted side-plate 19 shown in FIGURE 2 is securely attached in the groove formed by grooves 15, 16 and 17 so that it is mounted to fit flush with the side surface of the scarfing unit. This slotted side-plate 19 is of such size that its section 20 forms the stub side-wall 20 in FIGURE 1 and serves also to fill in the grooves 15, 16 and 17. The stub side-wall section 20 is preferably feathered toward the discharged end of the nozzle.

FIGURE 4 shows an exploded view of a bank of two scarfing units, A and B, assembled according to the present invention. The scarfing units A and B are each provided with a side-plate 18 at each end of the bank of units so that the continuous chamber formed by the respective chambers 13 are entirely closed at both ends of the bank and so that the continuous slot formed by the respective slots 11 of each of the units A and B is also closed at both ends for about 60% of its length. Two slotted side-plates 19 are each attached to the "inside" sides of units A and B in their respective grooves 15, 16 and 17. Since both side plates 19 fit into said grooves flush with the respective side walls of units A and B, respectively the two scarfing units may be closely butted up against each other. It can readily be seen that regardless of the number of such units in a bank, there is formed only one continuous combined expansion chamber 13 having only the stub side-wall 20 separating each of said individual chambers 13 from each other, as well as a truly continuous combined slot 11 extending from one end of the bank of units to the opposite end of such bank, with the result that the sheet-like stream of oxidizing gas flowing from the combined slot 11 at its discharge end 10 is one truly continuous stream.

In other words, the sides of each scarfing unit are enclosed from a length depending upon whether the unit is to be used as an "outside" unit or whether it is to be used as an "inside" unit in a bank of scarfing units. Where the scarfing unit is an "outside" unit the appropriate side end is covered with a plate 18. Similarly, when a unit is used by itself as an individual unit, both sides are covered with a side plate 18. When the unit is used as an "inside" unit both sides are covered with a slotted side-plate 19 thereby leaving slot 11 entirely open and the expansion chamber 13 covered only with the stub side-wall 20 which is of sufficient length to prevent leakage of air into said chamber. If such leakage occurs it disrupts the flow pattern within the unit, as well as diluting the stream of scarfing oxygen with nitrogen. The problem of air leakage while solved by the presence of the stub side-wall 20, could be solved by other appropriate means instead, such as, for example, soldering the individual scarfing units together along their outside contour. This, however, is undesirable from a maintenance point of view.

Figure 5:
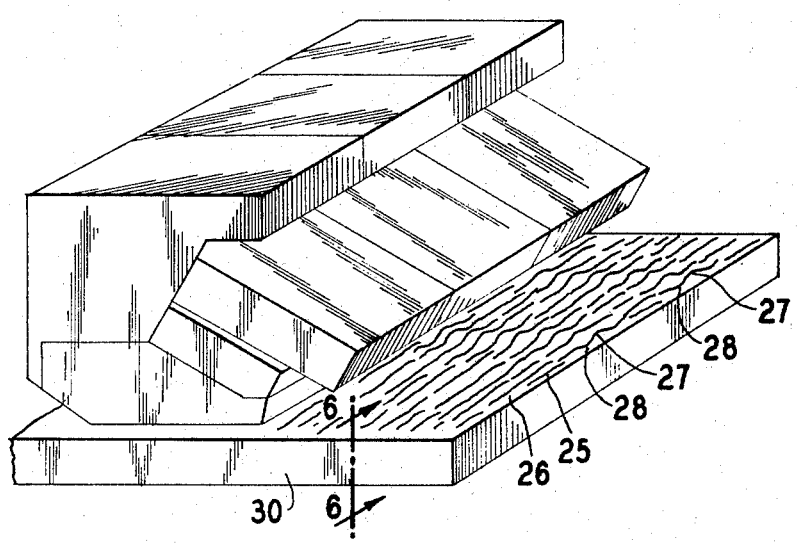
FIGURE 5 is a perspective view of a bank of three prior art scarfing units in a butted side-by-side relationship, and showing the problems encountered in scarfing a metal body with such units.
Figure 6:
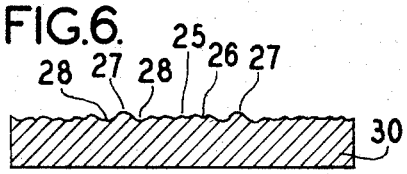
FIGURE 6 is a section taken along the line 6—6 of the scarfed metal body of FIGURE 5.

As has been noted before, the quality of the scarfed surface obtainable with the most advanced prior art scarfing units is not as high as desirable. The problem is particularly acute when such scarfing units are used in a bank wherein each unit is butted up next to another. FIGURES 5 and 6 illustrate the problem involved with prior art units. FIGURE 5 shows a bank of three prior art scarfing units and also the resultant problems encountered in scarfing with such units. FIGURE 6 is a cross section taken along the line 6—6 through the metal body 30 being scarfed. Across the width of each individual scarfing unit there are produced a series of hills 25 and valleys 26 which represent poor surface quality. These hills and valleys are believed to be caused by channelling of the scarfing oxygen in the continuous slot nozzle. In addition, a series of ridges 27 are produced along the point where the individual scarfing units butt up against each other. These ridges 27 are caused by a deficiency of scarfing oxygen at the side edges of the individual scarfing units referred to as end wall separation. Generally, a low section or wash 28 is produced on both sides of ridge 27. The uneven surface quality produced in the metal body 30 shows up as defects in the end produce made from such metal.

Figure 7:
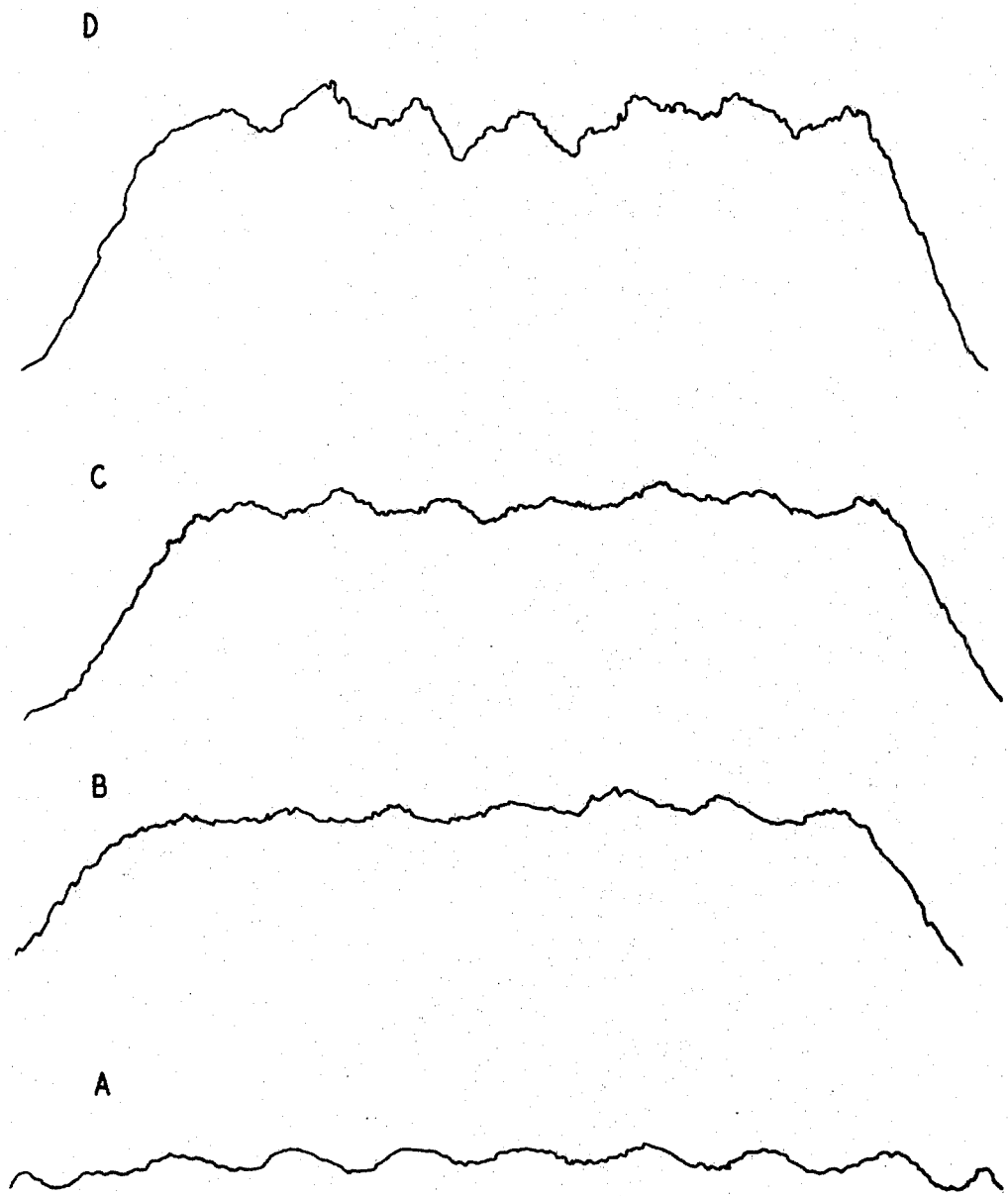
FIGURE 7 is a graph or flow profile of the impact pressure, at various flow rates, of the oxygen flowing from, and measured across the width of a typical standard continuous slot nozzle scarfing unit of the prior art.
Figure 8:
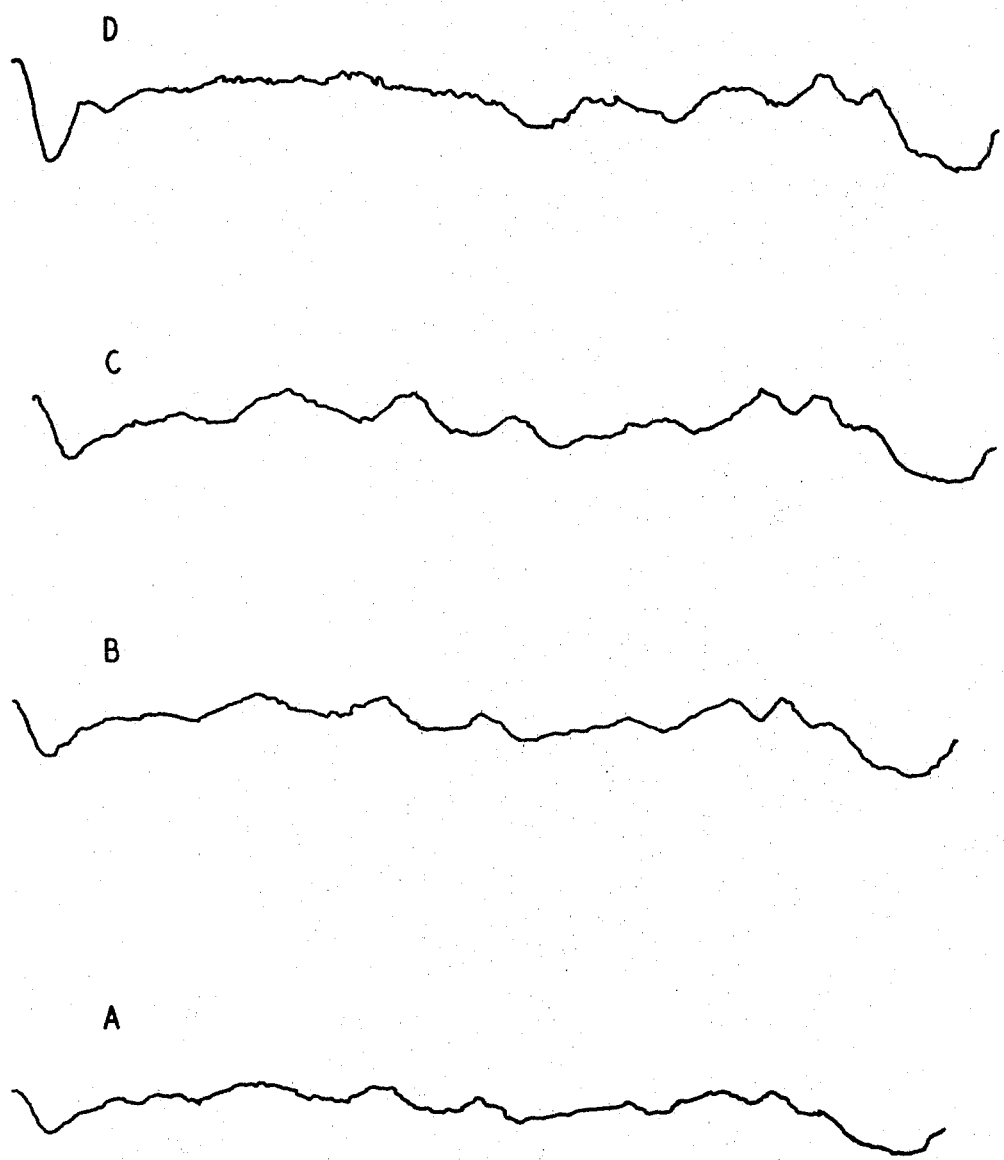
FIGURE 8 is a graph or flow profile of the impact pressure, at various flow rates, of the oxygen flowing from, and taken across the width of a standard continuous slot nozzle scarfing unit improved according to the present invention by having a tapered slot converging toward the discharge end thereof by about 0.5°, but having no expansion chamber.

FIGURES 7, 8 and 9 each show a series of flow profiles obtained by measuring the impact pressure of oxygen flowing from the discharge end of a slotted nozzle, measured widthwise across the nozzle. The measurement of impact pressure is used to determine the uniformity and the velocity of the oxygen flow rate across the nozzle.

Each graph contains four curves A, B, C and D; each curve representing a different flow rate, with curve A representing the lowest flow rate and curve D representing the highest flow rate in each case. These curves were obtained by moving a pressure sensing probe across the width of the slotted nozzle and automatically recording the pressure reading on a sheet of paper. The probe was mounted on a carriage and moved across the nozzle at constant speed by an air motor. In view of the fact that air pressure was used to drive the motor, its speed could not be controlled identically in each case. Thus, close observation of the curves shows that each curve is not exactly the same length, despite the fact that each of the nozzles measured 10.7 inches across its width and that each curve represents the flow rate across the entire width of each unit. The slight variation of the curve lengths caused by variation in the rate of probe travel is not significant enough to effect their reliability or usefulness.

Although the curves measure the impact pressure of the oxygen flowing from the nozzle, and give a flow profile of the oxygen flow across the nozzle, they are an accurate representation of the surface scarfed by such a gas flow. The hills and valleys produced on the surface of scarfed metal would, however, be the reverse of that shown by each curve. That is, along points where the impact pressure is high, a depression or valley would result in the surface of the metal being scarfed; and where the impact pressure is low, less metal would be scarfed away leaving a hill on the surface of the metal being scarfed.

FIGURE 7 shows the results obtained on a typical standard scarfing unit of the prior art, that is one having a slotted nozzle whose flat upper and lower surfaces are parallel to each other and having no expansion chamber. FIGURE 8 shows the results obtained by having a slotted nozzle converging at about 0.5°, but without the benefit of an expansion chamber in back of the slotted nozzle. FIGURE 9 shows the results obtained by having both the converging nozzle of FIGURE 8 as well as an expansion chamber in back of said nozzle. Table I below shows the oxygen flow rates used in obtaining each of the curves A, B, C and D for each figure. The term c.f.h./in. means cubic feet of oxygen per hour, per inch of nozzle width. Since each of the units is 10.7 inches wide the total rate of gas flowing through each unit can be obtained by multiplying the c.f.h./in. by 10.7.

TABLE I

| Curve | Figure 7 (c.f.h./in.) | Figure 8 (c.f.h./in.) | Figure 9 (c.f.h./in.) |
|---|---|---|---|
| A | 4,000 | 4,000 | 4,000 |
| B | 4,850 | 4,420 | 4,850 |
| C | 5,050 | 4,960 | 5,050 |
| D | 5,500 | 5,500 | 5,500 |

Referring to FIGURE 7 it can be seen that at the lowest flow rate, curve A, reasonably uniform oxygen pressure is displayed across the entire width of the unit, the surface quality, however, is not as high as desirable, in view of the relative difference in height between the hills and valleys. Curves B and C demonstrate that as the flow rate is increased, end wall separation begins to take place; that is, pressure is low indicating that very little oxygen is flowing near the two side edges of the unit. Consequently, very little metal would be scarfed at the edges of the unit, resulting in high ridges of unscarfed material along such edges. As the flow rate is increased, it can be seen that end wall separation becomes more severe, and that the oxygen flow begins to channel towards the center of the unit in a rough, uneven manner. Although the flow rate represented by curve A would produce a commercially acceptable scarfed surface, the results obtained from the flows represented by curves B, C and D would not be commercially acceptable. Hence, it can be seen that prior art scarfing units cannot be used at high flow rates and consequently are not useful for high speed scarfing.

FIGURE 8 shows the improved results obtained by using a converging slot scarfing nozzle in accordance with the present invention, but without the benefit of an expansion chamber. All of the curves A, B, C and D show that end wall separation and channeling toward the middle of the unit no longer take place even at high flow rates. However, a truly smooth flow pattern across the unit is still not obtained. At low flow rates such as represented by curve A, commercially acceptable, though poor quality, results can be obtained.

FIGURE 9 shows the benefits to be obtained by using both a converging continuous slot nozzle, as well as an expansion chamber in back of said nozzle, in accordance with the preferred form of the present invention. It can be seen from all four of the curves A, B, C and D that substantially no hills and valleys occur, and that consequently a metal surface scarfed with this unit would have a very high quality scarfed surface over the entire width of the scarfing unit. It is significant to note that not only has the quality problem been solved, and not only for a particular optimum flow rate, but that the high quality is maintained even at the high flow rates. Hence, this unit is useful for high speed as well as low speed scarfing to produce a scarfed surface of exceptionally high quality. Such units since they produce substantially no end wall separation, will, when used in a bank of units, produce no ridges or grooves where the units are butted up against each other.

Scarfing units according to the present invention may be used for hot as well as cold scarfing; with or without "powder"; and may be adapted to use either post-mixed or pre-mixed preheat fuel gas.

What is claimed is:
1. In a scarfing unit provided with flat upper and lower surfaces defining therebetween a wide continuous slot nozzle adapted to discharge a sheet-like stream of oxidizing gas in a zone extending across a metal body to be scarfed, the improvement comprising:
  (1) tapered upper and lower surfaces defining said slotted nozzle uniformly converging towards the discharge end of said nozzle by an included angle of from about 0.5 to up to about 5°, and
  (2) an expansion chamber communicating with the back end of said slotted nozzle, the side surfaces of said expansion chamber being closed for a distance at least sufficient to substantially prevent air from being drawn by vacuum into said chamber.
2. The apparatus of claim 1 wherein said vacuum is normally produced by the high velocity jets of oxidizing gas flowing into said chamber through one or more orifices.
3. The apparatus of claim 1 wherein said expansion chamber has a cross sectional area greater than the cross sectional area of the back end of said slotted nozzle.
4. The apparatus of claim 1 wherein said expansion chamber is of the same width as the slotted nozzle and has a thickness greater than the thickness of the back end of said slotted nozzle.
5. The apparatus of claim 4 wherein said scarfing unit comprises, in combination: an upper preheat block, a lower preheat block, a shoe and a head and wherein said continuous slot is formed by the lower surface of the upper preheat block and the upper surface of the lower preheat block, and wherein said chamber is located in the head.
6. The apparatus of claim 1 wherein said slotted nozzle converges towards the discharge end of said nozzle by an included angle of from about 0.5° to 1.0°.

References Cited

UNITED STATES PATENTS

| | | | |
|---|---|---|---|
| 2,745,475 | 5/1956 | Thompson et al. | 148—9.5 |
| 2,754,234 | 7/1956 | Holub et al. | 148—9.5 |
| 2,838,431 | 6/1958 | Allmang et al. | 148—9.5 |
| 2,873,224 | 2/1959 | Thompson et al. | 148—9.5 |
| 2,897,883 | 8/1959 | Miller | 148—9.5 |
| 3,231,431 | 1/1966 | Allmang | 148—9.5 |

EVERETT W. KIRBY, Primary Examiner

U.S. Cl. X.R.

148—9.5; 239—556, 566; 266—23